United States Patent
Watkins

(10) Patent No.: US 6,873,131 B1
(45) Date of Patent: Mar. 29, 2005

(54) DUAL VOLTAGE ELECTRIC MOTORS

(75) Inventor: William James Watkins, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/757,886

(22) Filed: Jan. 15, 2004

(51) Int. Cl.$^7$ .......................... H02H 5/04; H01H 71/16
(52) U.S. Cl. ...................... 318/782; 318/783; 318/789; 318/102; 361/26; 361/23
(58) Field of Search ................ 318/101–109, 318/782–795; 361/23–32

(56) References Cited

U.S. PATENT DOCUMENTS

| | | | |
|---|---|---|---|
| 1,987,662 A | | 1/1935 | Bletz |
| 2,191,158 A | | 2/1940 | Potter |
| 2,473,485 A | | 6/1949 | Vickers |
| 3,725,757 A | * | 4/1973 | Ehrens et al. ............... 318/795 |
| 3,875,462 A | | 4/1975 | Kiefer et al. |
| 4,066,937 A | * | 1/1978 | Pfarrer et al. ............... 318/775 |
| 4,225,812 A | | 9/1980 | Kraus |
| 4,258,368 A | * | 3/1981 | Arnold et al. .............. 318/782 |
| 4,334,162 A | | 6/1982 | Haag et al. |
| 4,379,291 A | | 4/1983 | Hubbard et al. |
| 4,384,312 A | * | 5/1983 | Fry .............................. 361/24 |
| RE31,367 E | | 8/1983 | D'Entremont |
| 4,408,244 A | | 10/1983 | Weible |
| 4,574,229 A | * | 3/1986 | Kim ........................... 318/788 |
| 4,761,592 A | | 8/1988 | Dissing et al. |
| 4,789,834 A | * | 12/1988 | Koopman ................... 324/417 |
| 4,894,571 A | | 1/1990 | Hildebrandt et al. |
| 5,345,126 A | | 9/1994 | Bunch |
| 5,729,416 A | * | 3/1998 | Renkes et al. ................ 361/23 |
| 6,040,646 A | | 3/2000 | Peters |
| 6,239,523 B1 | | 5/2001 | Janicek et al. |
| 6,244,824 B1 | * | 6/2001 | Centers et al. ................ 417/18 |
| 6,407,530 B1 | * | 6/2002 | Kwon et al. ................ 318/778 |
| 6,450,771 B1 | * | 9/2002 | Centers et al. ................ 417/12 |
| 6,479,913 B1 | | 11/2002 | Lin |
| 6,542,062 B1 | * | 4/2003 | Herrick ....................... 337/102 |
| 6,639,502 B2 | * | 10/2003 | Herrick ....................... 337/102 |
| 6,747,428 B1 | * | 6/2004 | Kwon et al. ................ 318/434 |
| 2003/0102954 A1 | * | 6/2003 | Herrick ....................... 337/102 |
| 2004/0021994 A1 | * | 2/2004 | Herrick ........................ 361/26 |

* cited by examiner

*Primary Examiner*—Paul Ip
(74) *Attorney, Agent, or Firm*—Michael Best & Friedrich LLP

(57) ABSTRACT

An electric motor selectively connectable to receive one of a plurality of supply voltages, the plurality of supply voltages comprising a low supply voltage and a high supply voltage. The motor can comprise a stator having a first winding and a second winding, a shaft rotatable about a motor axis, and a rotor supported by the shaft for rotation with the shaft relative to the stator. The motor can also comprise a voltage selection device, a first motor protector, and a second motor protector. The voltage selection device can include a first setting and a second setting and can be configured to connect the first winding in parallel with the second winding when set to the first setting and to connect the first winding in series with the second winding when set to the second setting. The first motor protector can be configured to limit current through the first winding and the second winding when an overload condition exists. The second motor protector can be configured to limit current through the first winding and the second winding when the voltage selection device is set to the first setting and the electric motor is connected to a high supply voltage.

20 Claims, 3 Drawing Sheets

DUAL VOLTAGE ELECTRIC MOTORS

BACKGROUND OF THE INVENTION

The present invention relates to electric motors, and more particularly to electric motors configured to selectively operate in one of a low voltage setting and a high voltage setting.

Dual voltage electric motors can be damaged and/or function improperly if connected to a power supply that is configured to provide a supply voltage that does not correspond to the voltage setting of the motor. When a dual voltage motor is set to operate in a low voltage setting, application of a high supply voltage may result in damage to the motor. When a dual voltage motor is set to operate in a high voltage setting, application of a low supply voltage may cause the motor to deliver insufficient performance.

In order to prevent damage to improperly connected motors, some motor manufacturers factory set motors to the high voltage setting. However, some installations require the motor be set at the low voltage setting. Therefore, if the installer does not change the factory set voltage setting, the motor operates improperly. Based on some installers' lack of knowledge regarding motors, assumptions are made that the motor is defective, and accordingly the motor is returned to the place of purchase. Such returns are problematic for the retailer as well as the motor provider.

SUMMARY OF THE INVENTION

Accordingly, the invention provides a dual voltage motor having a miswiring motor protection device sized to protect the motor in the instance where the motor is set for operation in the low voltage setting but a high supply voltage is applied to the motor. The miswiring motor protection device supplements the overload protection device common utilized in dual voltage motors. Such miswiring protection allows the motor manufacturer to provide motors that are factory set to the low voltage setting, thus reducing the number of unnecessary returns.

In some constructions, the miswiring protection device comprises a manual reset motor protector. An indicator on the motor can be utilized to alert the installer that the voltage setting needs to be changed to the high voltage setting before the motor protector is reset.

BRIEF DESCRIPTION OF THE DRAWINGS

The present invention is further described with reference to the accompanying drawings, which show a construction of the present invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the present invention. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
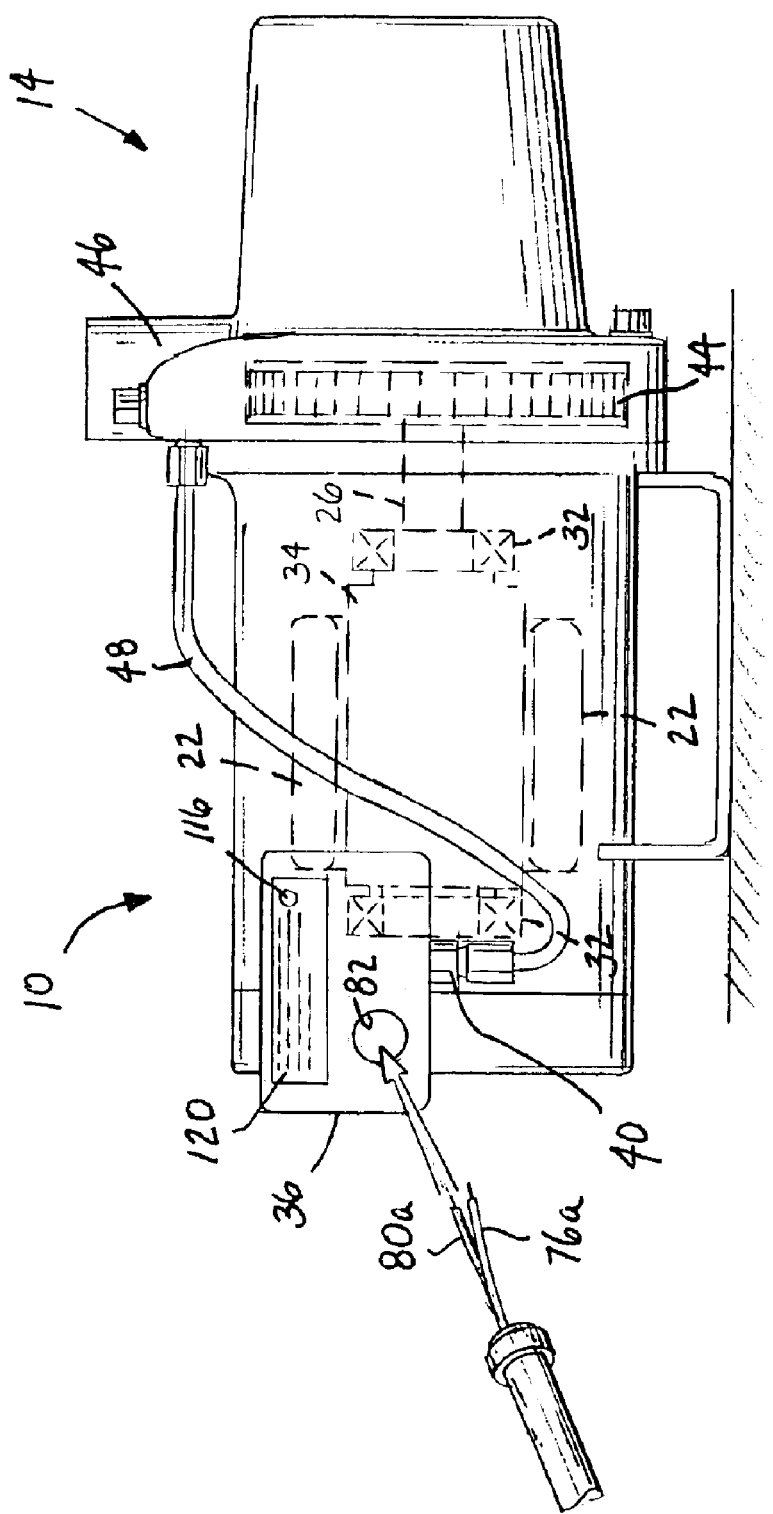
FIG. 1 is a side view of an electric motor and a pump.

Illustrated in FIG. 1 of the drawings is an electric motor 10 incorporating aspects of the invention. Some of the elements of the motor 10, which are discussed below, are shown in phantom and/or schematically illustrated. The motor 10 is illustrated drivingly connected to a fluid pump 14 for pumping fluid from a water well. It should be understood that aspects of the invention may be utilized in other types of electric machines and the motor 10 is merely shown and described as one such example.

With reference to FIG. 1, the motor 10 includes a housing 18, a stator 22 fixed relative to the housing 18, a shaft 26 (supported by bearings 32) for rotation about a motor axis relative to the housing 18, a rotor 34 connected to the shaft 26 for rotation with the shaft 26 relative to the stator 22, and a pressure switch control box 36 connected to the housing 18. In some constructions, the pressure switch control box 36 is threaded into a conduit receiving aperture of a control compartment of the housing 18. The pressure switch control box 36 includes a pressure switch 40.

The fluid pump 12 includes an impeller 44 that rotates relative to a housing 46 to pump fluid from a well to a water storage tank. The pressure switch 40 is connected to the fluid pump 12 via a pressure conduit 48 to measure the water pressure in the storage tank. The pressure switch 40 turns the motor 10 ON and OFF to maintain the water pressure in the storage tank within a preset pressure range.

Figure 2:
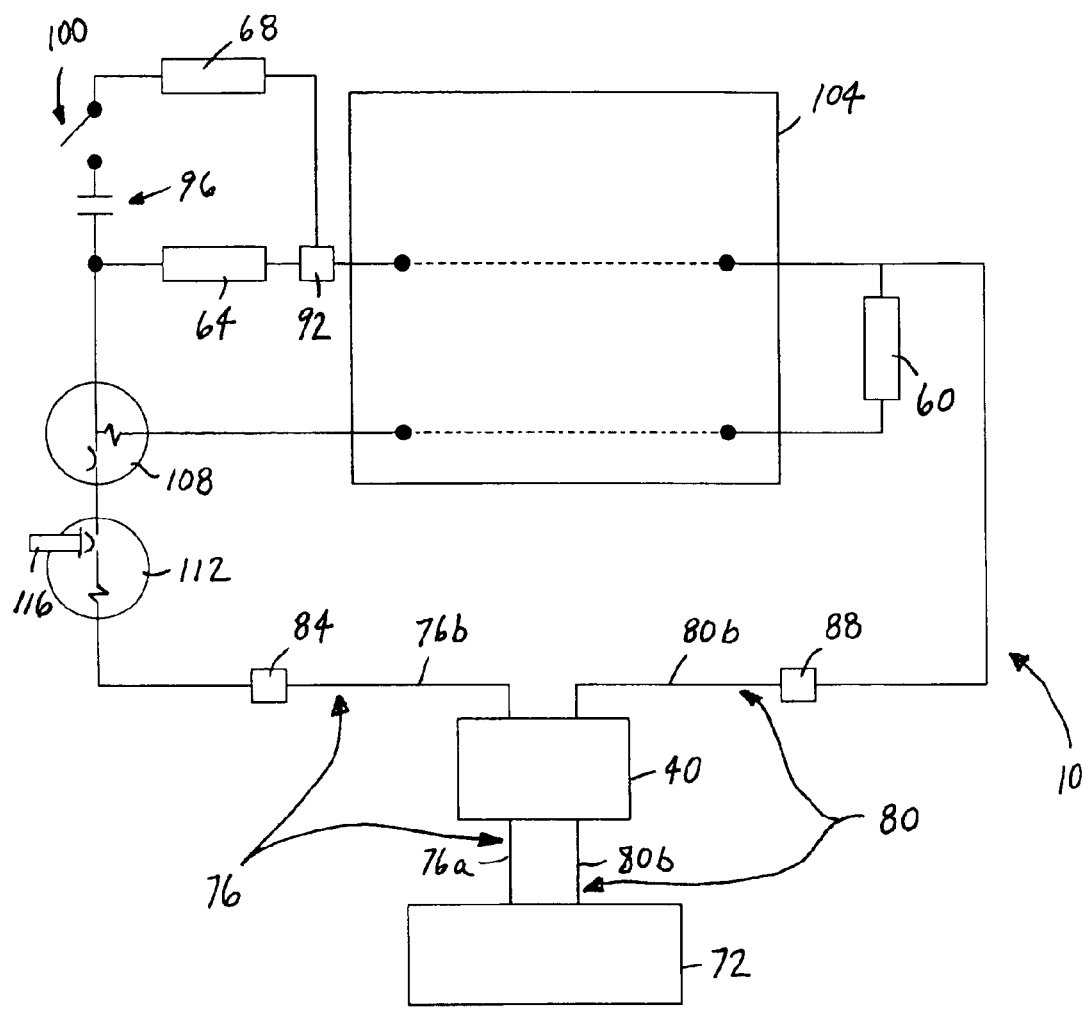
FIG. 2 is a diagrammatic view of the motor of FIG. 1 showing portions of the main field windings of the motor connected in parallel across a power supply.
Figure 3:
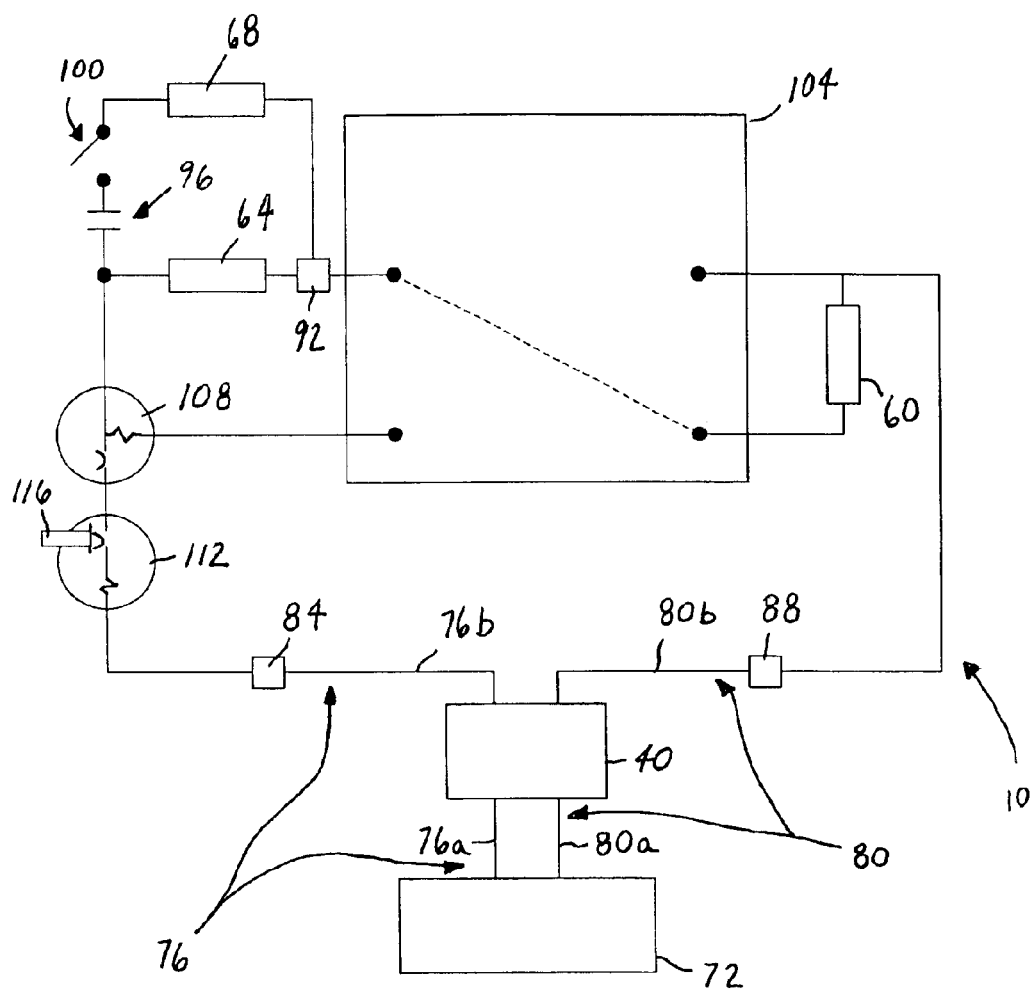
FIG. 3 is a diagrammatic view of the motor of FIG. 1 showing portions of the main field windings of the motor connected in series across a power supply.

With reference to FIGS. 2 and 3, winding indicators 60 and 64 represent the main stator windings of the motor 10. Winding indicator 68 represents the phase stator winding (e.g., a starting winding (shown) or an auxiliary winding) of the motor 10. The windings 60, 64, and 68 are electrically connectable across a power supply 72, which can be utility power, via a hot electrical conductor 76 and a neutral electrical conductor 80. In the illustrated construction, a first set of electrical conductors 76a and 80a extend through a conduit receiving aperture 82 (FIG. 1) defined in the pressure switch control box 36 for connection to the pressure switch 40. A second set of electrical conductors 76b and 80b extend from the pressure switch 40 to the control compartment of the motor 18 for connection to line terminals 84 and 88, respectively. In some constructions, the line terminals 84 and 88 are supported on a terminal board positioned in the control compartment. The terminal board may also support a common terminal 92.

With reference to FIGS. 2 and 3, the motor 10 also includes a capacitor 96 and a starting switch assembly 100 that act in combination with the winding 68 during motor startup, a voltage selection device 104 (e.g., a switch), a main motor protector 108, and a supplemental motor protector 112. The motor 10 may include fewer or more electrical components in other constructions.

The voltage selection device 104, which is user operable, is utilized to connect the winding 60 in parallel with the winding 64 when the device 104 is in a low voltage setting (see FIG. 2), and connect the winding 60 in series with the winding 64 when the device 104 is in a high voltage setting (see FIG. 3). In one construction, the low voltage setting is approximately 115 volts and the high voltage setting is approximately 230 volts. In other constructions, the low voltage setting and/or the high voltage settings may vary. The voltage selection device 104 can include any design capable of selectively connecting the windings 60 and 64 in one of a parallel arrangement and a series arrangement. One example of a voltage selection device is disclosed in U.S. Pat. No. 6,040,646, which is incorporated herein by reference.

The main motor protector 108 comprises an overload protection device that protects the motor 10 from damage during overload conditions. The overload conditions may include at least one of a current overload condition, a thermal overload condition, and a combination of a current overload condition and a thermal overload condition. The main motor protector 108 can include at least one of current sensitive motor protector, a temperature sensitive motor protector, and a combination of a current sensitive motor protector and a temperature sensitive motor protector. The illustrated main motor protector 108 includes an automatic reset motor protector (i.e., the main motor protector 108 automatically resets when the overload condition has stabilized). In other constructions, the main motor protector 108 includes other types of motor protectors (e.g., a manual reset motor protector). The main motor protector 108 generally does not provide sufficient protection when the motor 10 is connected to a high voltage supply instead of a low voltage supply. In one construction, the main motor protector 108 includes an automatic reset bimetallic device.

The supplemental motor protector 112 comprises a miswiring protection device that protects the motor 10 from damage when the motor 10 is incorrectly connected to a high voltage supply instead of a low voltage supply. The supplemental motor protector 112 can include a manual reset motor protector or a one-time use motor protector (e.g., a fuse). A manual reset motor protector allows for reset of the supplemental motor protector 112 without the use of replacement parts. The manual reset motor protector includes an actuator 116 that is depressed to reset the supplemental motor protector 112. In some constructions, the actuator 116 is visible during normal operation of the motor 10. Such placement increases the likelihood that an installer will see the actuator 116 and know that a reset activity must occur before the motor 10 can operate. Further, an indicator 120 such as a label placed near the actuator 116 can instruct the installer to change the low voltage setting of the motor 10 to the high voltage setting of the motor 10 prior to resetting the supplemental motor protector 112. If the installer resets the motor 10 prior to changing the voltage setting of the motor 10, the supplemental motor protector 112 likely will continue to trip to protect the motor 10. In one construction, the supplemental motor protector 112 includes a manual reset bimetallic device.

Use of a visible actuator 116 and/or an indicator 120 may be particularly useful in motor configurations where the power connection is separate from the voltage selection device 104. When installing the motor 10, the installer only needs to connect the electrical conduits 76*a* and 80*a* to the pressure switch 40. The installer does not need to access the control compartment of the motor 10. Accordingly, the installer does not necessarily see the voltage selection device 104 and thus may not realize that the voltage setting of the motor 10 may need to be changed. Placement of the actuator 116 and/or the indicator 120 adjacent the conduit receiving aperture 82 of the pressure switch control box 36 may increase the likelihood of the installer realizing the voltage setting of the motor 10 needs to be checked. If the installer does not immediately realize the voltage setting is incorrect, the installer likely will view the actuator 116 and/or indicator 120 when the supplemental motor protector 112 trips.

With reference to FIGS. 2 and 3, the supplemental motor protector is connected in series with the main motor protector between the hot electrical conductor 76 and the windings 60 and 64. Placement of the motor protectors 108 and 112 between the windings 60 and 64 and the hot electrical conductor results in deenergization of the windings 60 and 64 when at least one of the motor protectors 108 and 112 trips. In other constructions, the motor protectors 108 and 112 may be alternatively connected to the windings 60 and 64 and the power supply 72.

The constructions described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An electric motor selectively connectable to receive one of a plurality of supply voltages, the plurality of supply voltages comprising a low supply voltage and a high supply voltage, the electric motor comprising:

a stator comprising a first winding and a second winding;

a shaft rotatable about a motor axis;

a rotor supported by the shaft for rotation with the shaft relative to the stator;

a voltage selection device comprising a first setting and a second setting, the voltage selection device configured to connect the first winding in parallel with the second winding when set to the first setting, and connect the first winding in series with the second winding when set to the second setting;

a first motor protector configured to limit current through the first winding and the second winding when an overload condition exists; and a second motor protector configured to limit current through the first winding and the second winding when the voltage selection device is set to the first setting and the electric motor is connected to receive a high supply voltage.

2. An electric motor according to claim 1 wherein the first motor protector comprises an automatic reset motor protector.

3. An electric motor according to claim 1 wherein the second motor protector comprises a manual reset motor protector.

4. An electric motor according to claim 1 wherein the manual reset motor protector comprises an actuator for manual reset of the second motor protector, and wherein the actuator is visible during normal operation of the electric motor.

5. An electric motor according to claim 3 and further comprising an indicator adjacent the actuator, and wherein the indicator comprises instructions to change the voltage selection device to the second setting before resetting the second motor protector.

6. An electric motor according to claim 1 wherein the second motor protector is a one-time use motor protector.

7. An electric motor according to claim 1 wherein the overload condition comprises at least one of a thermal overload condition, a current overload condition, and a combination of a thermal overload condition and a current overload condition.

8. An electric motor according to claim 1 wherein the first motor protector is at least one of a current sensitive motor protector, a temperature sensitive motor protector, and a combination of a current sensitive motor protector and a temperature sensitive motor protector.

9. An electric motor according to claim 1 wherein the second motor protector is at least one of a current sensitive motor protector, a temperature sensitive motor protector, and a combination of a current sensitive motor protector and a temperature sensitive motor protector.

10. An electric motor according to claim 1 wherein the first winding is connected in parallel with the second winding via the first motor protector when the voltage change device is set to the first setting.

11. An electric motor according to claim 10 wherein the second motor protector is connected in series with the first motor protector when the voltage change device is set to the first setting.

12. An electric motor according to claim 1 wherein the first and second windings are connected in series with the first and second motor protectors when the voltage change device is set to the second setting.

13. An electric motor according to claim 1 wherein the first winding and the second winding are electrically connectable to a power supply via a hot electrical conduit and a neutral electrical conduit, and wherein the first and second motor protectors are electrically connected between the hot electrical conduit and the first and second windings.

14. An electric motor selectively connectable to receive one of a plurality of supply voltages, the plurality of supply voltages comprising a first supply voltage and a second supply voltage, the second supply voltage being greater than the first supply voltage, the electric motor comprising:
  a stator including a first winding and a second winding;
  a shaft and rotor rotatable about a motor axis;
  a switch comprising a first setting and a second setting, the switch being configured to connect the first winding in parallel with the second winding when the switch is set to the first setting and connect the first winding in series with the second winding when the switch is set to the second setting;
  an overload protection device electrically connected to the first winding and the second winding during normal operation of the electric motor; and
  a miswiring protection device electrically connected to the first winding and the second winding during normal operation of the electric motor.

15. An electric motor according to claim 14 wherein the overload protection device is configured to limit current through the first winding and the second winding when an overload condition exists.

16. An electric motor according to claim 14 wherein the miswiring protection device is configured to limit current through the first winding and the second winding when the switch is set to the first setting but the electric motor is connected to receive a second supply voltage.

17. An electric motor selectively connectable to receive one of a plurality of supply voltages, the plurality of supply voltages comprising a low supply voltage and a high supply voltage, the electric motor comprising:
  a stator comprising a first winding and a second winding;
  a shaft rotatable about a motor axis;
  a rotor supported by the shaft for rotation with the shaft relative to the stator;
  a voltage selection device comprising a first setting and a second setting, the voltage selection device configured to connect the first winding in parallel with the second winding when set to the first setting, and connect the first winding in series with the second winding when set to the second setting;
  an overload protection device electrically connected to the first winding and the second winding during normal operation of the electric motor, the overload protection device being configured to limit current through the first winding and the second winding when an overload condition exists; and
  a miswiring protection device electrically connected to the first winding and the second winding during normal operation of the electric motor, the miswiring protection device being configured to limit current through the first winding and the second winding when the voltage selection device is set to the first setting and the electric motor is connected to receive a high supply voltage.

18. An electric motor according to claim 17 and further comprising a pressure switch, wherein the first and second windings are electrically connected to a power supply via the pressure switch.

19. An electric motor according to claim 17 wherein the miswiring protection device comprises a manual reset miswiring protection device, wherein the manual reset motor protector comprises an actuator for manual reset of the miswiring protection device, and wherein the actuator is visible during normal operation of the electric motor.

20. An electric motor according to claim 19 and further comprising an indicator adjacent the actuator, and wherein the indicator comprises instructions to change the voltage selection device to the second setting before resetting the miswiring protection device.

* * * * *